(12) United States Patent
Goldszer et al.

(10) Patent No.: US 11,293,197 B2
(45) Date of Patent: Apr. 5, 2022

(54) MOBILE CART CONVERTIBLE TO CANOPY SHELTER

(71) Applicant: JGR Copa, LLC, Hollywood, FL (US)

(72) Inventors: Jacob Goldszer, Hollywood, FL (US); Hasani Thompson, Palmdale, CA (US)

(73) Assignee: JGR COPA, LLC

( * ) Notice: Subject to any disclaimer, the term of this patent is extended or adjusted under 35 U.S.C. 154(b) by 0 days.

(21) Appl. No.: 16/930,912

(22) Filed: Jul. 16, 2020

(65) Prior Publication Data

US 2021/0332607 A1   Oct. 28, 2021

Related U.S. Application Data

(60) Provisional application No. 63/014,569, filed on Apr. 23, 2020.

(51) Int. Cl.
| | |
|---|---|
| *E04H 15/30* | (2006.01) |
| *B62B 3/02* | (2006.01) |
| *E04H 15/46* | (2006.01) |
| *E04H 15/50* | (2006.01) |

(52) U.S. Cl.
CPC ............... *E04H 15/30* (2013.01); *B62B 3/02* (2013.01); *E04H 15/46* (2013.01); *E04H 15/50* (2013.01)

(58) Field of Classification Search
CPC ......... E04H 15/30; E04H 15/50; E04H 15/46; B62B 3/02
See application file for complete search history.

(56) References Cited

U.S. PATENT DOCUMENTS

| | | | |
|---|---|---|---|
| 1,702,010 | A | 5/1926 | Klever |
| 2,224,087 | A | 6/1938 | Reichert |
| 2,210,540 | A | 8/1940 | Nielson |
| 3,147,497 | A | 9/1964 | Diaz |
| 3,278,953 | A | 10/1966 | Willis |

(Continued)

FOREIGN PATENT DOCUMENTS

| | | |
|---|---|---|
| CA | 2443254 A1 | 9/2003 |
| DE | 20105646 U1 | 3/2001 |

(Continued)

*Primary Examiner* — Noah Chandler Hawk
(74) *Attorney, Agent, or Firm* — Robert C. Kain; Scott D. Smiley; Scott N. Garrett

(57) ABSTRACT

The mobile cart, convertible to a canopy shelter, scissor member rectilinear expandable side frameworks having closed, fully open and intermediate modes. A canopy framework of extendable canopy struts. A central hub pivotally connected to upper strut ends. Vertically extendable legs having corner joints pivotally connected to lower strut ends and to adjacent side scissor frameworks. Each leg has a wheel. A fabric canopy cover on the expanded side framework when the struts form a pitched frame. Struts have a substantially closed, vertical stand mode when telescopically collapsed. Struts have a cart-floor mode at an intermediate length when legs are intermediate height, forming an open top wheeled cart. Fully collapsed, canopy cover is interstitial vertical standing struts and collapsed side frameworks. Method from compact form, extending frameworks and struts first to intermediate rectilinear position for the cart-mode; then lifting hub, extending struts while extending the frameworks to a canopy deployed position.

19 Claims, 17 Drawing Sheets

(56) References Cited

U.S. PATENT DOCUMENTS

| | | | |
|---|---|---|---|
| 3,536,083 A | 10/1970 | Reynolds | |
| 3,619,827 A | 11/1971 | Mackenzie | |
| 3,623,765 A | 11/1971 | Bowen | |
| 3,753,590 A | 8/1973 | Couix | |
| 4,194,785 A | 3/1980 | Cox et al. | |
| 4,523,768 A | 6/1985 | Dlubala | |
| 4,914,768 A | 4/1990 | Howard | |
| 5,096,214 A | 3/1992 | Walker et al. | |
| 5,210,888 A | 5/1993 | Canfield | |
| 5,228,716 A | 7/1993 | Dahl | |
| 5,448,853 A | 9/1995 | Harman | |
| 5,622,198 A | 4/1997 | Elsinger | |
| 6,036,209 A | 3/2000 | Tsumura et al. | |
| 6,079,777 A | 6/2000 | Simmons et al. | |
| 6,712,083 B2 * | 3/2004 | Carter | E04H 15/50 135/114 |
| 6,848,461 B2 * | 2/2005 | Tsai | E04H 15/50 135/131 |
| 6,923,458 B2 | 8/2005 | Hooper et al. | |
| 7,963,530 B1 * | 6/2011 | Garcia | B62B 3/02 280/30 |
| 7,971,898 B2 | 7/2011 | Wise | |
| 8,011,686 B2 | 9/2011 | Chen et al. | |
| 8,220,824 B2 * | 7/2012 | Chen | B62B 3/02 280/651 |
| 8,418,709 B2 | 4/2013 | Lindeman et al. | |
| 9,145,154 B1 * | 9/2015 | Horowitz | B62B 7/008 |
| 9,574,367 B2 * | 2/2017 | Hatfield | E04H 15/48 |
| 9,995,058 B2 * | 6/2018 | Jin | G08C 17/02 |
| 10,227,791 B2 | 3/2019 | Lindeman et al. | |
| 10,422,154 B2 * | 9/2019 | Farris | E04H 15/38 |
| 10,871,007 B1 * | 12/2020 | Tsai | A61F 5/37 |
| 11,066,843 B2 * | 7/2021 | Zemskov | B62B 5/0013 |
| 2002/0088171 A1 | 7/2002 | Shepherd | |
| 2005/0067802 A1 | 3/2005 | Lambert | |
| 2013/0233363 A1 | 9/2013 | Lindeman et al. | |
| 2014/0001735 A1 * | 1/2014 | Yang | B62B 3/02 280/651 |
| 2016/0060896 A1 * | 3/2016 | Toohey | E04H 15/32 135/120.1 |

FOREIGN PATENT DOCUMENTS

| | | |
|---|---|---|
| FR | 2788676 | 1/1999 |
| GB | 2225985 | 6/1990 |
| JP | 3750104 | 12/2005 |

* cited by examiner

SIDE

FRONT

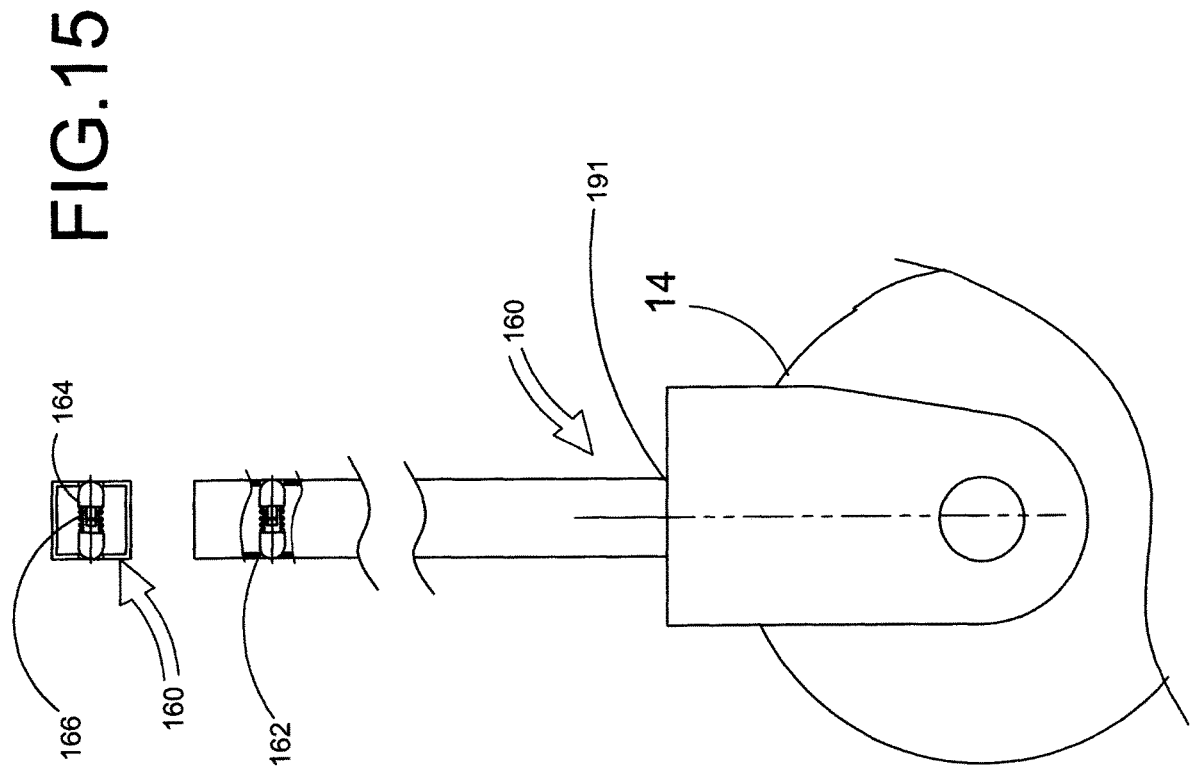

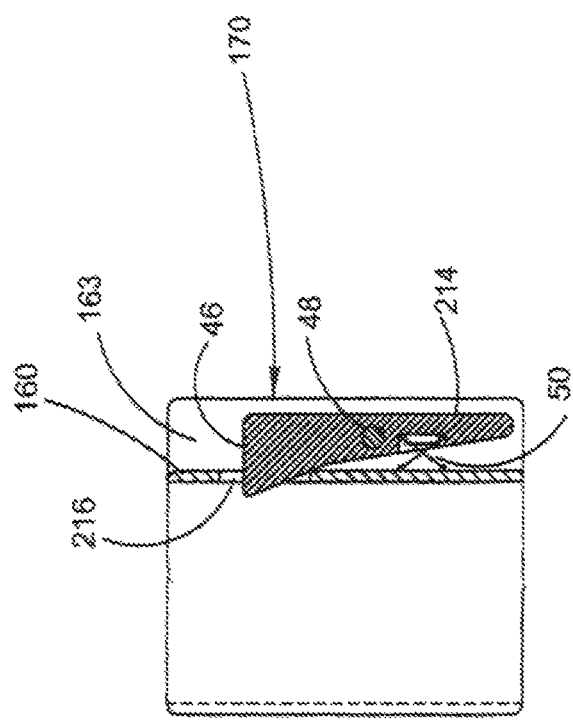

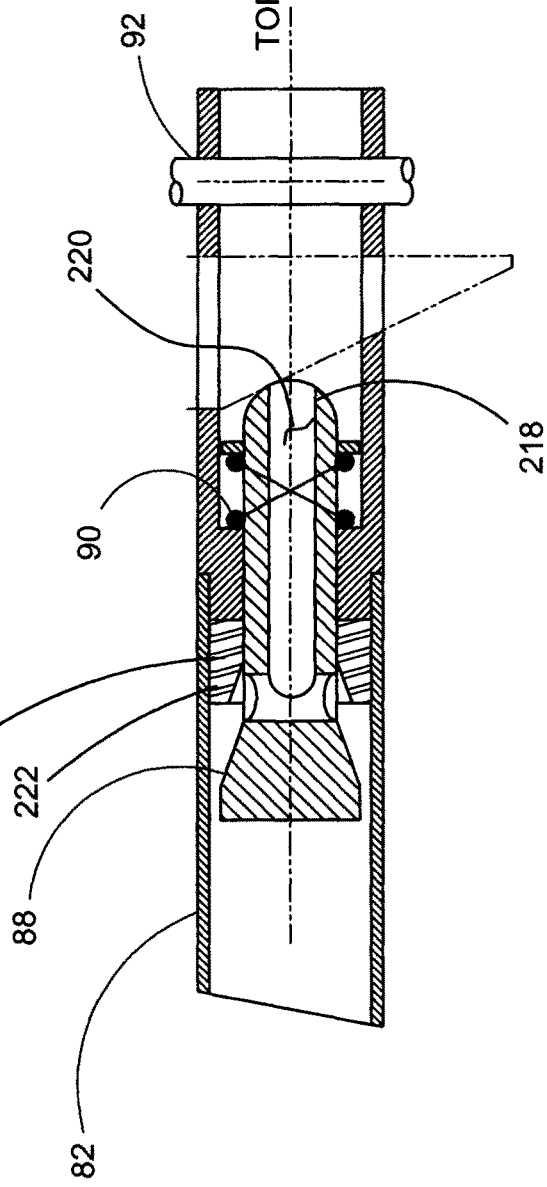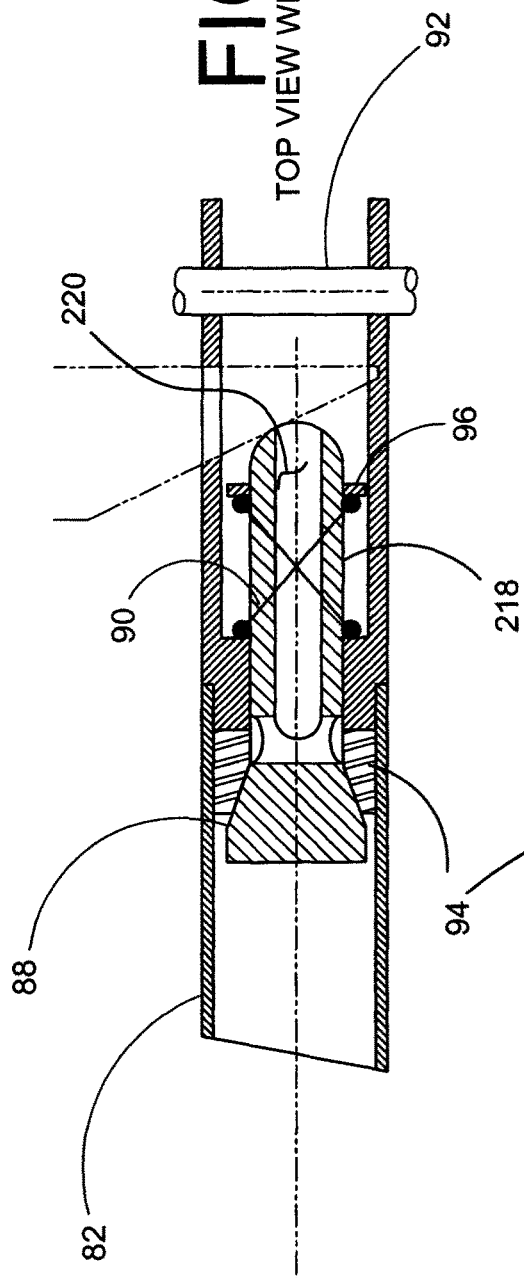

MOBILE CART CONVERTIBLE TO CANOPY SHELTER

This is a regular, non-provisional patent application claiming the benefit of priority of provisional patent application No. 63/014,569, filed Apr. 23, 2020, entitled "Collapsible All-In-One Mobile Cart With Optional Conversion To Shelter And Table," currently pending, the contents of which is incorporated herein by reference thereto.

The present invention relates to a mobile cart convertible to a canopy shelter which can also be collapsed into a compact, transportable, carriable or rollable form, and a method.

BACKGROUND OF THE INVENTION

Canopy shelters are oftentimes used at the beach, in parks, and during tailgate parties before a sporting event. Prior art canopy shelters can be broken down into a compact form and reassembled at the desired location by the user when needed. Also, carts or wagons are often times used to carry towels, blankets, coolers and foodstuffs in parks, beaches and at tailgate events. Some prior art carts can be broken down into small, compact forms to enable the cart to be stored in the trunk of an automobile, recreation vehicle, truck, garage or storage facility. The user can assemble these collapsible carts to form a wagon or wheeled cart as needed to transport items to a desired campsite, location or beach location.

Several mobile beach wagons carry and transport several items but the user sometimes wishes to transport a larger shelter to accommodate their family and friends. In some cases, the mobile beach wagons carry canopy tents or shelters. Assembly/disassembly of these separate items (the cart and the canopy tent) is a complex process which requires both time and manual efforts. The structure of the mobile beach wagon does not have enough stability to sustain the shelter for any longer period of time. Many will not convert to a canopy style shelter. Further, it may require an external power source to operate the structure setup.

It is desirable to have a device that is a mobile cart to carry a plurality of items that also converts, through use of telescopic tubing, into a shelter with an optional table. Furthermore, it is also desirable to have a device or system that collapses back down into a smaller, easy to store, compact, single piece of equipment. Still further, it is desirable to have a device or system which is a one-piece, multi-use device. Therefore, there currently exists a need in the industry for a device or system and an associated method that is a collapsible mobile beach cart configured to be used as a shelter or a canopy for a user, and a cart for carrying a plurality of articles and a small table with ease of maintenance and storage.

There exists number of prior arts such as U.S. Pat. Nos. 7,909,148, and 9,283,974, but none of the devices are suitable for using the mobile cart both as a canopy shelter for beach-goers and also a cart to conveniently transport goods or other items.

The present invention solves a problem of having to distinct systems, a canopy shelter and a separate mobile cart to transport items to the desired campsite, tailgate location or beach location. The present invention relates to a mobile cart which is convertible to a canopy shelter and the entire system can be collapsed by the user into a compact, transportable, carriable or wheeled form for easy storage in a vehicle or garage.

OBJECTS OF THE INVENTION

It is an object of the present invention to provide a mobile cart convertible to a canopy shelter.

It is another object of the present invention to provide a mobile cart convertible to a canopy shelter which can be further collapsed into a compact, transportable form.

Other objects, features and advantages of the present invention will become apparent from the following descriptions of the various embodiments of the invention. It should be understood, however, that the detailed description and the specific examples, while indicating specific embodiments of the invention, are given by way of illustration only, since various changes and modifications within the spirit and scope of the invention will become apparent to those skilled in the art from this detailed description.

SUMMARY OF THE INVENTION

The present invention relates to a mobile cart convertible to a canopy shelter system and a method associated with the system. With respect to the cart/canopy system, it is a collapsible all-in-one mobile cart that can be converted into a canopy shelter and with an optional table. The mobile cart converts into a mobile shelter with ease of operation, maintenance and transportation. This cart/canopy system can be used as a collapsible all-in-one mobile beach cart and canopy to carry all types of items thereby eliminating the number of trips from the car or hotel to the beach or recreational spot.

The core components of the invention are collapsed mode, wagon mode, and canopy mode, which, generally speaking, are configured as follows. In an embodiment, the collapsible mobile cart comprises a base frame comprising a first frame end and a second frame end configured to define a substantially rectangular construct. A pair of front wheels are connected to the first frame end of the base frame and a pair of rear wheels are connected to the second frame end of the base frame, wherein the front and rear wheels are separated by a predefined lateral distance along the base side frames. The base frame is configured to receive and hold a plurality of articles selected from at least one of an umbrella, a carton, a chair, a toy, a towel and a cooler.

In another embodiment, a handle is positioned at the first end of the cart and is configured to assist a user in maneuvering the cart on a ground or sand surface. A pair of vertical telescopic tube members are provided at the first frame end and second frame end of the base frame which is configured to assist the user in converting the mobile cart into a shelter and, optionally, a table.

In a basic construct, the mobile cart, convertible to a canopy shelter, includes front, rear, left and right side expandable frameworks. Each side framework has a plurality of scissor members. Each side framework can be placed in a scissor closed mode, wherein each side framework is foreshortened, and a scissor open mode wherein each side framework is elongated and expanded to a substantially fully open condition. Also, the side frameworks can be placed in a cart-form mode wherein each side framework is partly elongated and the lateral and longitudinal span of the frameworks is intermediate the scissor closed mode and the scissor open mode. The system includes a canopy framework with a plurality or number of telescopically extendable canopy struts, each having releasable inter-strut locks. A central hub has a respective plurality of pivotable connectors attached to corresponding ones of the plurality of canopy struts. The system has four vertically telescopically extendable legs. Each leg has a wheel at one terminal end (the lower end) and each leg has an upper leg segment. Each upper leg segment has pivotal framework connections defining a respective corner between adjoining side frameworks. The legs have telescopically extendable leg members with releasable inter-leg member locks. A fabric canopy cover is used which is large enough to span the side framework in the scissor open mode. The canopy struts have a fully extended, locked open canopy mode forming a pitched canopy frame. The central hub forms a roof or canopy peak when the canopy framework is in the open canopy mode. The canopy struts have a substantially closed, vertical stand mode wherein each canopy strut is substantially telescopically collapsed. The struts also have a cart-floor mode wherein each canopy strut is partly telescopically collapsed to an intermediate length, that is, a length between the substantially closed, stand mode and the open canopy mode. A removable cart floorboard is adapted to be placed atop the plurality of canopy struts when in the cart-floor mode. In this cart-floor mode, the struts form floor beams for the open-top, wheeled cart.

When the side frameworks are in the cart-form mode, the canopy struts are in the cart-floor mode. The cart floorboard is placed atop the canopy struts in the cart-floor mode. The fabric canopy is folded over the side frameworks in the cart-form mode to form a wheeled open-top cart.

Further details of the cart convertible to the canopy shelter include legs having a substantially telescopically collapsed storage mode, a partly extended intermediate cart-form mode, and a fully vertically extended canopy mode. Other details include, when the canopy struts are in the substantially closed, vertical stand mode, and the side frameworks are in the scissor closed mode, the fabric canopy cover is folded to an interstitial location between the side frameworks and the canopy struts.

In some embodiments, when the canopy struts are in the substantially closed, vertical stand mode, and the side frameworks are in the scissor closed mode, the central hub does not substantially extend above the side frameworks. In other embodiments, the central hub has a respective plurality of upper pivotable connectors attached to corresponding ones of the plurality of canopy struts. Each of the four vertically telescopically extendable legs have a lower leg segment with the respective wheel at its lower terminus. Each lower leg segment has a respective lower pivotal strut connection attached to corresponding ones of the plurality of canopy struts opposite the upper pivotable connectors.

Eaves may be added to the canopy cover wherein the eaves hang over the side framework in the scissor open mode. In another iteration, the canopy struts in the cart-floor mode form diagonal floor supports for the cart floorboard and at least one inter-strut lock on each telescopically extendable canopy strut is locked. Another iteration has the cart floorboard as a hinged floorboard with hinged floor plates. A respective floor plate has a lateral span substantially equivalent to a corresponding side framework while in the scissor closed mode. In this manner, when the hinged floorboard removed from the open-top cart, each respective hinged floor plate partly wraps around a corresponding side framework when the canopy struts are in the substantially closed, vertical stand mode, the side frameworks are in the scissor closed mode, and the fabric canopy cover is folded interstitial the side frameworks and the canopy struts.

Otherwise, the central hub forms a vertically extensive peak when the canopy framework is in the open canopy mode, and the peak being above each elongated, expanded side framework while in the scissor open mode. The canopy struts are substantially adjacent each other in the substantially closed, vertical stand mode. The locks may be mechanical, pneumatic or hydraulic.

The method of converting a mobile cart to a canopy shelter includes the following elements. The system provides for front, rear, left and right side expandable frameworks, each side framework having a plurality of scissor members. The system includes a canopy framework formed by a plurality of telescopically extendable canopy struts. A central hub is pivotally connected to the plurality of canopy struts. The system includes four vertically telescopically extendable legs with wheels at terminal ends thereof. Each extendable leg having an upper leg segment defining a side framework corner which is pivotally connected to adjoining side frameworks. The method also provides for a fabric canopy cover large enough to span the expanded side frameworks and a removable cart floorboard. The removable cart floorboard may be a portion of the canopy cover, thereby forming a soft fabric floorboard.

The method includes forming a compact form wherein the side frameworks are in a scissor closed mode, the canopy struts are in a substantially telescopically closed, vertical stand mode, and the vertically extendable legs are in a telescopically leg collapsed positional mode. Thereafter, substantially simultaneously extending the side frameworks and the canopy struts to an intermediate side frameworks position and an intermediate canopy struts position while depressing the central hub and telescopically diagonally expanding the canopy struts. This causes the central hub to lockdown into a cart-floor support frame. Further downward movement of the canopy struts below the horizontal plane of the floor forms the cart-floor support frame. An open-top cart is formed by placement of the cart floorboard (or arrangement of portions of the canopy cover) atop the cart-floor support frame. Excess canopy cover hangs over the side frameworks in the intermediate side frameworks position. The fabric canopy cover defines sidewalls of the open-top cart. A canopy shelter is formed after removal of the cart floorboard. The canopy shelter is disposed above a ground plane by lifting the central hub and telescopically extending the canopy struts while substantially simultaneously extending the side frameworks to a canopy deployed positional mode. In this mode, the scissor members are elongated beyond the intermediate side frameworks position. The canopy struts are locked in the canopy deployed mode to maintain the side frameworks in the canopy deployed mode. To raise the system, the legs are telescopically vertically extended to a high canopy position above the ground plane. The legs are locked together for stability.

Alternatively, or in addition, the fabric canopy cover is attached to the central hub thereby forming a fabric cart floor above the canopy struts and the cart-floor support frame, and thereby eliminating the use of the cart floorboard. Further, the method forms eaves along the periphery of the fabric canopy cover with excessive cover materials. Another aspect of the method includes, in the compact form, placing the fabric canopy cover in the interstitial space between the side frameworks in the scissor closed mode and the canopy struts in the telescopically closed, vertical stand mode. A rectilinear cover is provided as is an exposed carrying handle. The method includes taking the rectilinear cover and enveloping the side frameworks, the canopy framework, the telescopically closed canopy struts in the vertical stand mode, the vertically extendable legs in the telescopically leg collapsed positional mode, and the fabric canopy cover. After such action, the collapsed compact construct provides both wheeled transport of the compact form and handle-carried transport of the compact form.

Further alternatives include providing the cart floorboard as a two-part hinged floorboard panel system. Prior to enveloping the compact construct with the rectilinear cover, the hinged floorboard panels are partly wrapped around the compact form. This compact form includes the fabric canopy cover in the interstitial space, the side frameworks in the scissor closed mode, and the canopy struts in the telescopically closed, vertical stand mode. With the partly wrapped around floor panels, the rectilinear cover is placed about the paneled compact form. Further, the system forms a pitched canopy frame with the central hub forming a vertically extensive peak when the canopy framework is in the open canopy mode. Also as an alternative, the telescopically collapsed canopy struts, in the closed, vertical stand mode, have the central hub at a vertical position such that the hub does not substantially extend above the side frameworks when the side frameworks are in the scissor closed mode.

Another embodiment provides for a removable cart floorboard with four collapsible table legs pivotally disposed beneath the cart floorboard. Upon withdrawal of the cart floorboard from the open-top cart, the table legs are deployed downward to the ground plane which enables elevations of the floorboard above the ground plane to form a table.

BRIEF DESCRIPTION OF THE DRAWINGS

Further objects and advantages of the present invention can be found in the detailed description of the several preferred embodiments when taken in conjunction with the accompanying drawings.

FIG. 14 diagrammatically illustrates one of the leg members with a wheel, and certain button locks as inter-leg member locks.

FIG. 15 diagrammatically illustrates a button lock.

FIG. 16 diagrammatically illustrates a hinged latch-in-slot lock as an alternative to the button locks in the system (in the preferred embodiment, the extendable legs have inter-leg member locks, one of which is a hinged latch-in-slot lock, and another is a button lock).

FIG. 19 diagrammatically illustrates a pneumatic or hydraulic locking system in an open condition.

FIG. 20 diagrammatically illustrates the pneumatic or hydraulic locking system in a locked condition.

DETAILED DESCRIPTION OF THE EMBODIMENTS

Figure 1:
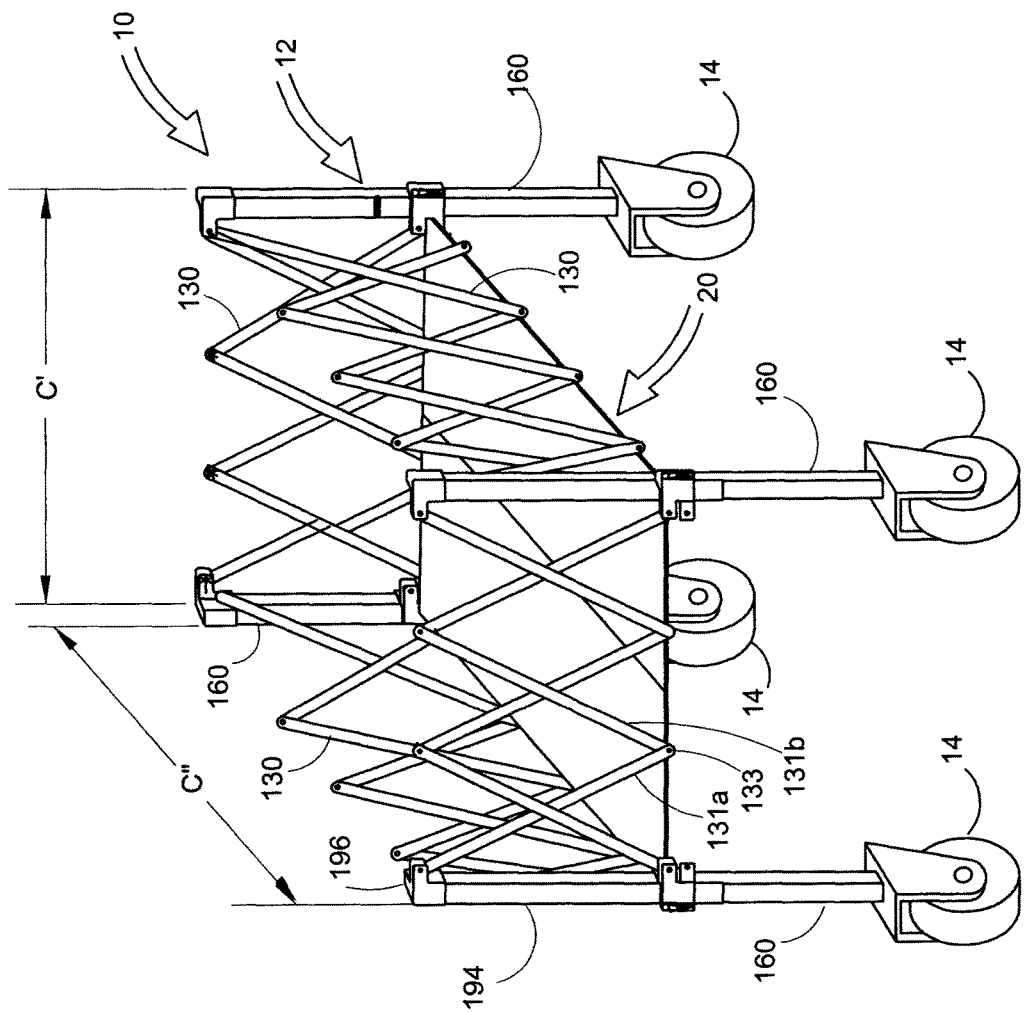
FIG. 1 diagrammatically illustrates the framework structure for the mobile, wheeled cart.

The present invention relates to a mobile cart convertible to a canopy shelter. Further, the system can be deconstructed to a compact, transportable form for easy storage in a vehicle, garage or truck. In the drawings, similar numerals designate similar items. Also, a description of one component explains the construction and operation of similar components unless otherwise discussed herein. For example, the description of one telescopically extendable leg, applies equally to the other telescopically extendable legs. The present invention may be embodied in other specific forms without departing from its spirit or essential characteristics. The described embodiments are to be considered in all respects only as illustrative and not restrictive.

The present invention is related to a collapsible mobile beach cart configured to be used as a shelter or a canopy for a user, a cart for carrying a plurality of articles, and optionally, a small table, all with ease of maintenance and storage.

The invention advantageously fulfills the aforementioned deficiencies by providing convertible wagon-to-tent which provides a collapsible all-in-one mobile cart with optional conversion to shelter. In general, the collapsible mobile cart includes a base frame comprising a first frame end and a second frame end configured to define a substantially rectangular cross-sectional frame; a pair of front wheels are connected to the first frame end of the base frame and a pair of rear wheels connected to the second frame end of the base frame, wherein the front and rear wheels are separated by a predefined distance along the base frame. The base frame is configured to receive and hold a plurality of articles selected from at least one of an umbrella, a carton, a chair, a toy, a towel and a cooler. A handle is positioned at the first frame end of the cart and is configured to assist a user in maneuvering the cart on a ground surface. A pair of vertical telescopic tube members are supported by a plurality of web members and the base frame is configured to assist the user in converting the mobile cart into a shelter and, optionally, a table for extended use. The cart/canopy shelter system may have a removable cart-mode floor base plate for use as a table.

Similarly, the associated method may also include one or more of the following steps: removal of the floor base plate during the transition phase from storage to wagon, and removal of the cart floor base plate of the wagon to transition to a functional table.

There is a need for a collapsible mobile beach cart with support sections to store a plurality of items and to easily convert the mobile beach cart into a shelter and, optionally a table, for multi-purpose extended use.

The open top base frame of the collapsible mobile cart is configured to receive and hold a plurality of articles selected from at least one of an umbrella, a carton, a chair, a toy, a towel and a cooler. However, open top base frame could be expanded to hold any other article, according to the proposed invention. The base frame structure could be mounted onto the cart via a plurality of slots to receive and store the articles carried by the user.

In another embodiment, the collapsible mobile cart further comprises a handle positioned at the second frame end of the cart configured to assist a user in maneuvering the cart on the ground surface. The handle may be a pair of vertical telescopic tube members provided at the first frame end and second frame end of the base frame configured to assist the user in converting the mobile cart into a shelter. The web members of the cart are configured to provide easy enablement as a shelter whenever the user converts the cart to a shelter. The mobile cart could be easily collapsible by applying manual pressure to the web members so that the vertical telescopic tube members will come close to each other as a single unit. A fabric canopy covering the shelter is provided in the cart and with the help of the handle, the user could easily collapse and expand the covering as well as the vertical telescopic tube members to form the shelter. The fabric canopy covering could be cloth material selected from at least one of a nylon, polyethylene, polypropylene, polyurethane, or combinations. In some embodiments, the covering could be water-proof so that it can be used during rainy season to protect items from getting wet.

In one optional embodiment, the vertical telescopic tube members are configured to be extended and adjusted in size to convert the cart into the table. The open top base frame is configured to act as a support plate on top and the wheels assist the user in moving it. Similarly, the web members are compressed to convert the cart into the shelter or optionally a table based upon user's requirements. In exemplary embodiments, the mobile cart is configured to expand up to 48"×21"×36" dimension and raises up to 96"×73"×85" in the shelter mode. Further, the shelter is configured to be collapsed to manageable 38"×15"×11" for easy transportation.

In one embodiment, the covering comprises a plurality of entry points such as buttons and snaps to configure the mobile cart into the shelter. In the same way, these entry points assist the user in collapsing the shelter configuration easily into the mobile cart.

The embodiments described herein disclose a collapsible mobile cart for the user as an all-in-one unit to easily set up, transport and store several items at their convenience. The cart can be easily transported over beach sand with the help of a wheel set and the design of the cart allows the user can pull the cart with ease. The canopy components in the all-in-one unit can be brought separately and fitted together at the destination site when needed. The collapsible mobile cart can be manufactured to be lightweight, easily deployable and collapsible as a single unit.

In the canopy shelter mode, the side framework is fully extended and the canopy is made of waterproof material for shelter. The vertical telescopic tube members are configured to extended and adjusted in size to convert the cart. Similarly, the members are decompressed or elongated to convert the cart into the shelter. The base frame of the mobile cart forms the rigid and stable support for the mobile cart. A pair of front wheels is connected to the first frame end of the base frame and a pair of rear wheels is connected to the second frame end of the base frame. The front wheels and rear wheels are separated by a predefined distance along the base frame. Both the set of wheels in front and rear positions are configured to assist the user in easy maneuvering of the mobile cart along a solid ground or sand surface. The front wheels and rear wheels are separated in such a way that the movement of the cart is made flexible when the user pulls it along the ground surface.

In the compact storage mode, all telescoping tubes are collapsed down for easy storage and transport of the cart/canopy shelter system. The mobile cart can be easily collapsible by applying manual pressure to the web members so that the vertical telescopic tube members will come close to each other as a single unit.

The drawings show a view of the fully extended canopy shelter embodiment and a handle in the compact mode used for grip during transportation with the telescoping tubes being fully collapsed for ease of storage or transport. Other views show a handle and extending support telescoping tubes for extension to the shelter-canopy embodiment.

Different features, variations, and multiple different embodiments are shown and described with various details. What has been described herein for specific embodiments is done for illustrative purposes only and without the intent to limit or suggest that what has been conceived is only one particular embodiment or specific embodiments. It is to be understood that the invention is not limited to any single specific embodiments or enumerated variations. Many modifications, variations and other embodiments will come to mind of those skilled in the art, and which are intended to be and are in fact covered by both this disclosure. For example, button locks (FIG. 15) can be exchanged for hinge-bar latch-slot locks (FIG. 16). Also, persons of ordinary skill in the art recognize that the strut interlocks and/or the leg interlocks may be twist-to-close locks. It is intended that the scope of this invention should be determined by a proper legal interpretation and construction of the disclosure, including equivalents, as understood by those of skill in the art relying upon the complete disclosure present at the time of filing.

Figure 5:
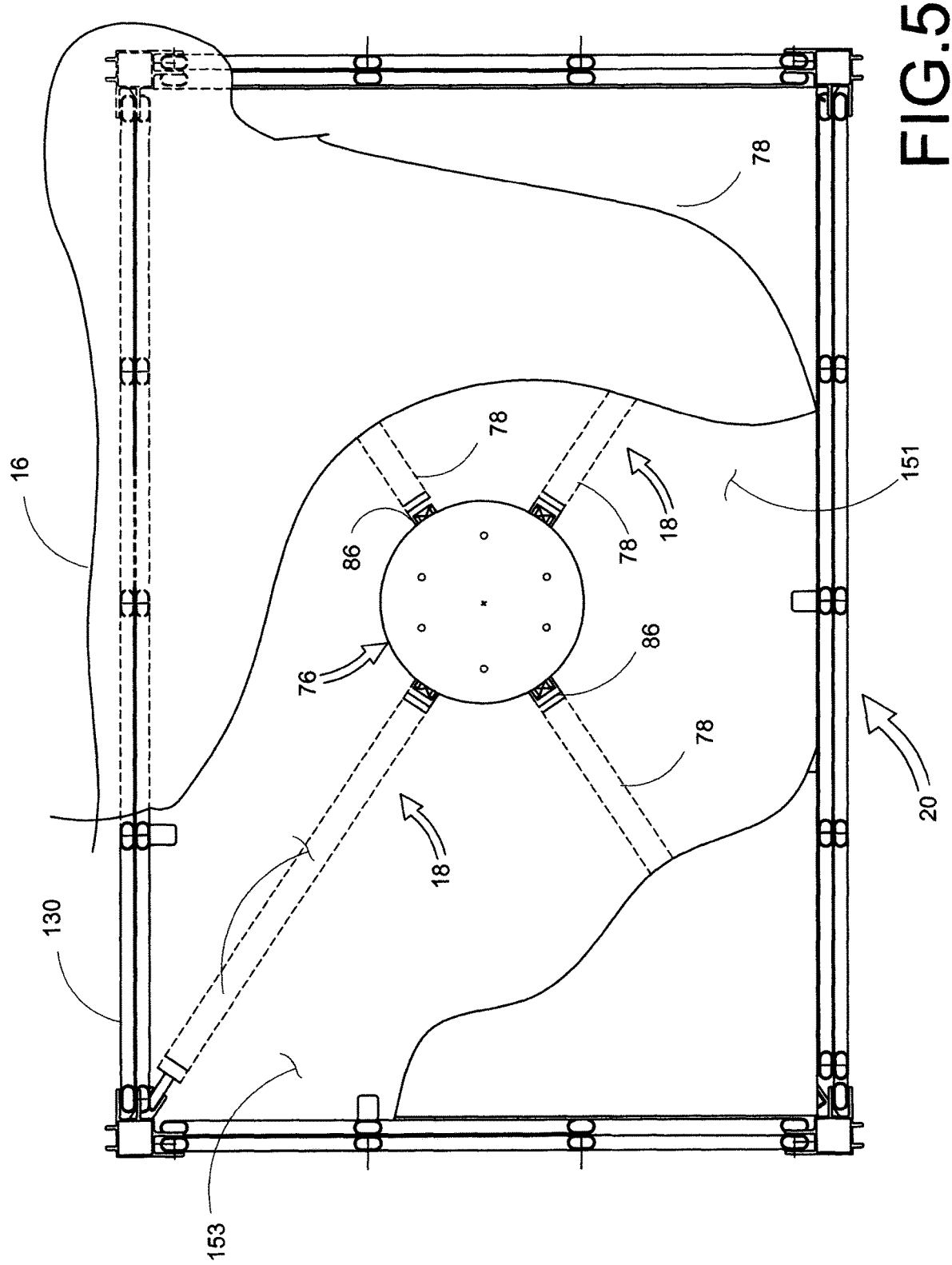
FIG. 5 is a plan top view of the wheeled cart (also showing a partial, broken away view of the fabric canopy cover draped over the cart floor, the framework side walls, and the corners of the open top, wheeled cart).

FIG. 1 diagrammatically illustrates the cart-canopy system in the cart-form mode without the fabric canopy cover draped over the cart. FIG. 5 diagrammatic diagrammatically illustrates a top plan view of the system in the cart-form mode with portions of the fabric canopy cover draped over the side framework and the canopy cover shown broken away and the figure. Cart-canopy system 20 in FIG. 1 diagrammatically illustrates four vertically telescopically extendable legs 160. Each leg has wheel 14 at leg terminal end 191. The side framework has front, rear, left, and right side expandable frameworks 130.

The side frameworks 130 include scissor members 131a, 131b which are pivotally connected to each other. The side frameworks 130 are pivotally attached to an upper leg region or segment 194 by upper leg pivotal connections 196. In this manner, the scissor members of the side frameworks 130 can be extended or compressed/expanded due to the pivotal connection 133 between each scissor member 131a, 131b, and the upper leg pivotal connections 196. At the lower end of upper leg segment 194, another pivotal leg connection 135 is attached to the end to the adjacent scissor member of the side framework 130.

FIG. 1 diagrammatically shows that, in the cart-form mode, the side framework 130 is partly elongated and is intermediate the scissor closed mode (fully closed or collapsed)(shown in FIGS. 9, 10 and 11) and the scissor open mode (substantially fully open and elongated)(shown in FIG. 3), wherein each side framework 130 is elongated and fully extended. Stated otherwise, the front end of the system in the cart-form mode of FIG. 1 has a distance C' and the sides of the cart typically have a different distance C". In the scissor open or fully deployed mode shown in FIG. 3, side frameworks 130 open a distance B' and B" which is much larger than the cart-form mode C', C".

Figure 2:
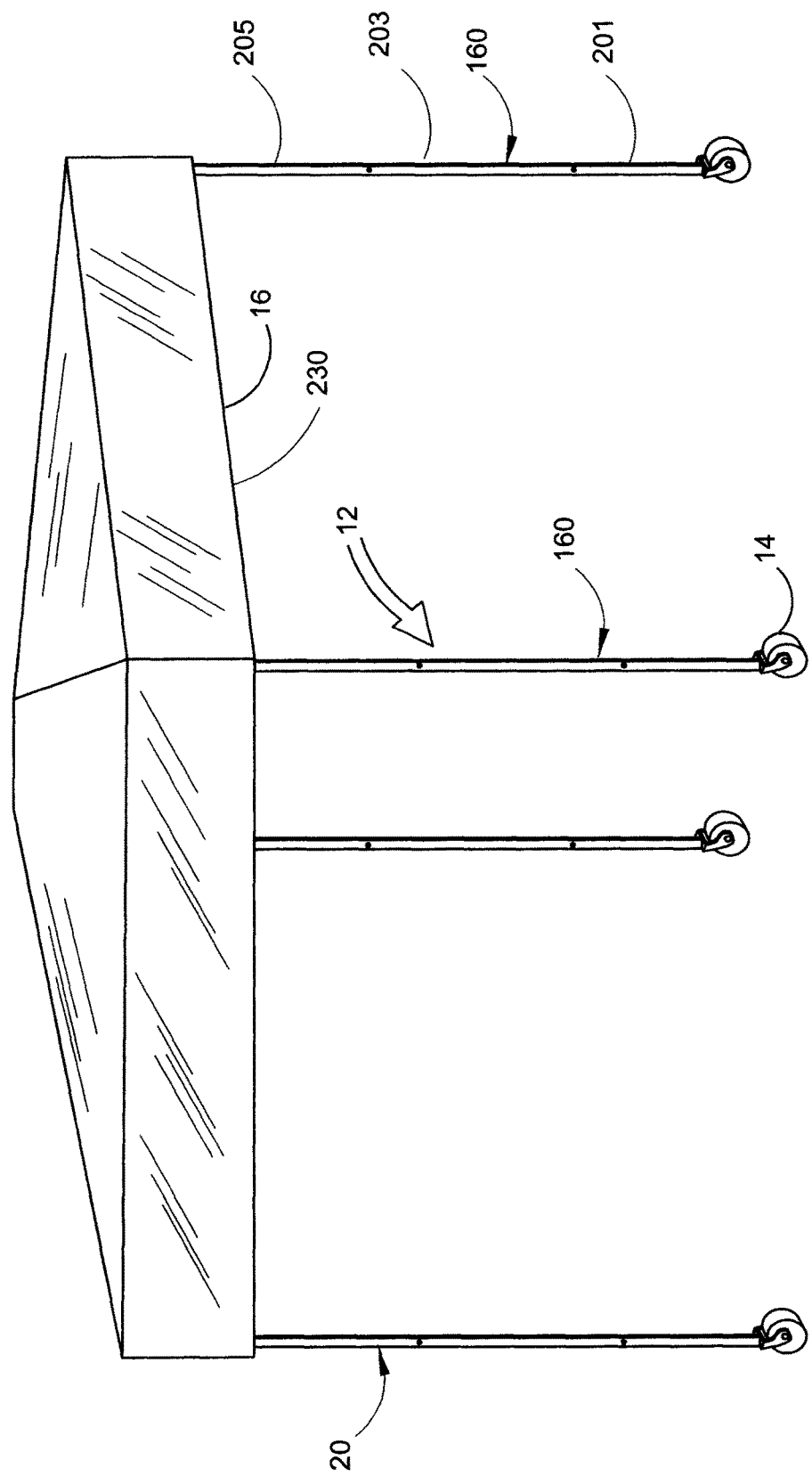
FIG. 2 diagrammatically illustrates the canopy shelter.

FIG. 2 diagrammatically illustrates the cart-canopy system 20 as a canopy shelter. The fabric canopy cover 16 is large enough to span the side frameworks 130 in the fully extended, open canopy mode (referring to FIGS. 2, 3). Additionally, fabric canopy cover 16 includes eaves 230 which hangover the side framework in the scissor open mode.

FIG. 2 also shows that vertically telescopically extendable legs 160 have telescopically extendable leg members 201, 203, 205, and releasable inter-leg member locks 170 which lock the leg members thereby prohibiting the collapse of the canopy framework 18. These inter-leg member locks are shown and discussed later in connection with FIG. 6, and hinge lock 170 (latch-slot lock), in FIG. 4, button lock 40 in FIG. 15, and button lock 162.

Figure 3:
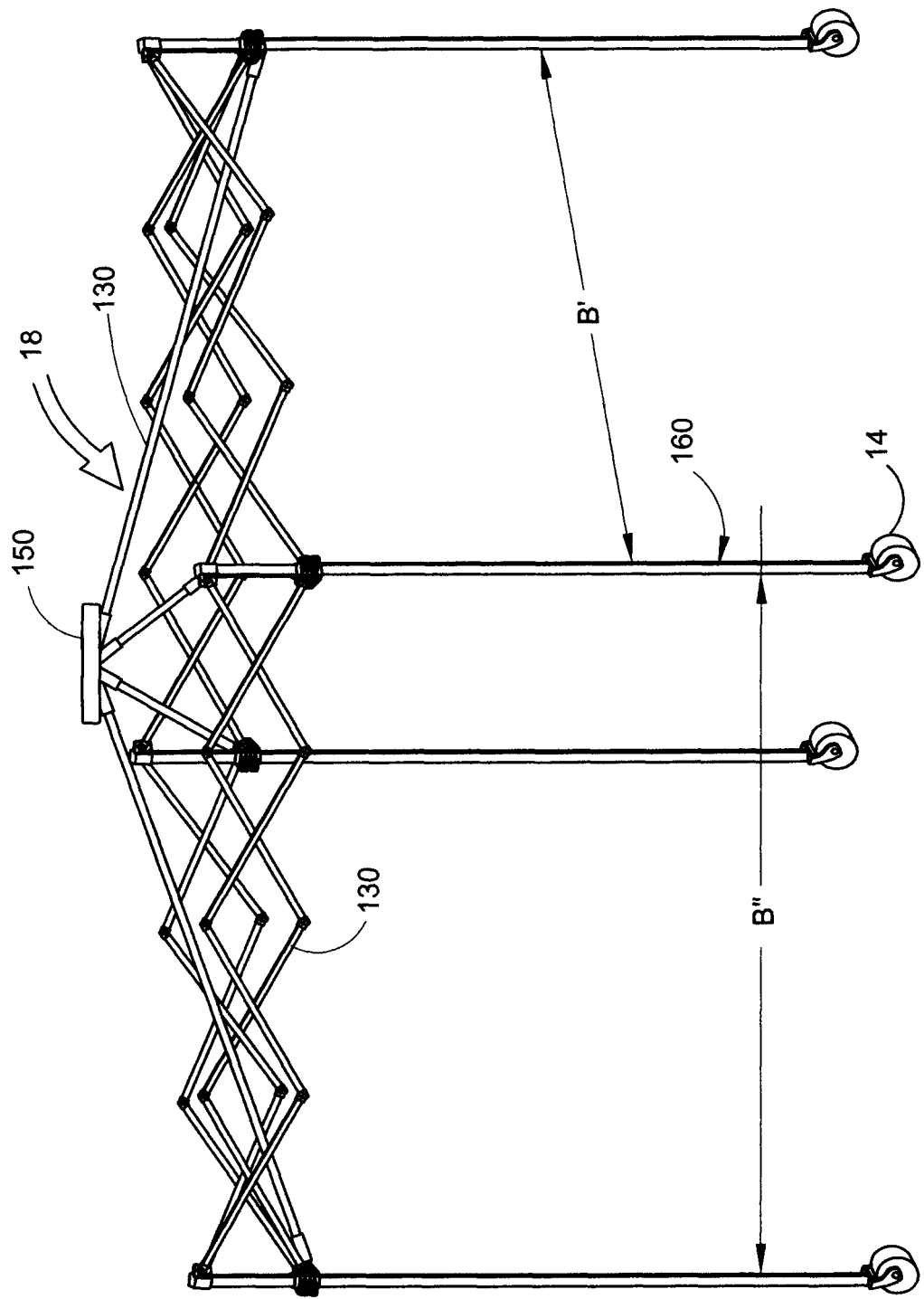
FIG. 3 diagrammatically illustrates the framework for the canopy structure.

FIG. 3 diagrammatically illustrates the cart-shelter system in the fully extended, locked open canopy mode. The scissor members of the side frameworks 130 are fully extended or substantially fully extended to support the periphery of fabric canopy cover 16. Typically, the corners of the canopy are not attached to the elevated corners of the vertical legs. In this manner, the cover 16 can be re-folded for the cart-mode and the fully collapsed mode. Canopy framework 18 is formed by a plurality of telescopically extendable canopy struts, one of which is canopy strut 141. In the substantially fully scissor open mode, the side frameworks 130 form a rectangular shelter having a side distance B" and a shortened front and rear side distance B'.

Figure 4:
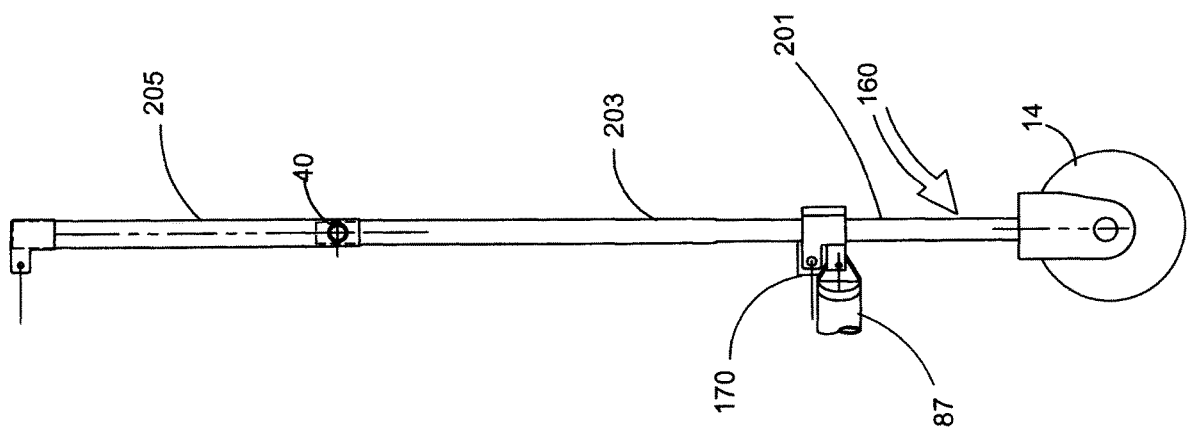
FIG. 4 diagrammatically illustrates one of the four telescopically vertically extendable legs.

FIG. 4 diagrammatically illustrates one of the several telescopically extendable legs 160 having leg members 201, 203, 205. Hinge lock 170 (latch and slot) permits the user to lock the leg members in a fully open vertical position (latch engaged, closed) and button lock 40 also permits the user to lock the telescopically extendable leg 160 in a fully open position. Both are inter-leg locks and are interchangeable. Also, persons of ordinary skill in the art may employ different inter-leg and inter-strut locks than discussed herein. Also, persons of ordinary skill in the art recognize that the strut interlocks and/or the leg interlocks may be twist-to-close locks. These twist locks lock two components when rotated in one direction and unlock the components when rotated in the opposite direction.

FIG. 5 diagrammatically illustrates a top plan view of the cart-canopy system in the cart-form mode. Fabric canopy cover 16 is draped over partly collapsed side framework 130 (the side framework being in an intermediate elongated mode). Canopy cover 16 is shown in a partly broken away view to show a removable cart floorboard 151, 153 which is placed atop canopy struts 78. The struts, which are supporting floor beams, are shown in dashed lines. In this intermediate, partly collapsed mode, in the preferred embodiment, most of the struts have been telescopically collapsed together and only a single strut is mainly fully extended. In this manner, the struts form a cart floor beam system which has relatively better vertical support strength than a beam system wherein all the struts are partly telescopically extended in the cart-form intermediate extended strut mode. Central hub 150 is pivotally coupled by pivotal couplers 86 to the canopy struts.

In the illustrated embodiment, the removable cart floorboard is a hinged floorboard with hinged floor plates 151, 153 that are joined together by a flexible hinge 152. Hinge 152 may be a common hinge or fabric or other element permitting floor plate 151 to rotate and pivot with respect to floor plate 153. The system in another embodiment may use a single floorboard in the cart-mode rather than the hinged panel floor plate system.

Figure 6:
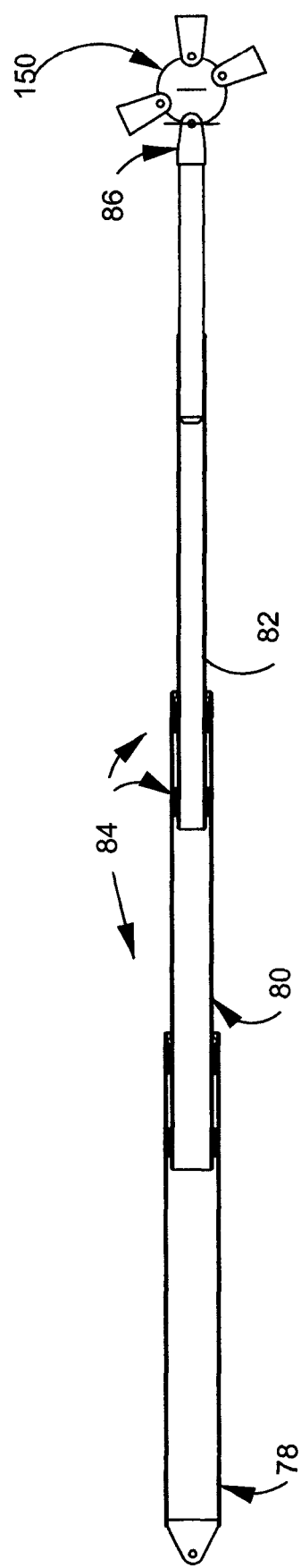
FIG. 6 diagrammatically illustrates one of the several telescopically extendable canopy struts and the central hub.

FIG. 6 diagrammatically illustrates a canopy strut including strut members 78, 80, 82, and 81. The upper end of canopy strut member 81 is pivotally connected by connector 86 to central hub 150. The lower end of the distal strut (the strut farther away from the hub) has its distal end pivotally connected to corner 194. Leg corner 194 is the lower corner on the upper segment 194 of the leg (the upper corner 196 has a pivotal connection to the upper scissor member of the side frameworks). These canopy struts 78, 80, 81, 82, also include releasable inter-strut locks 84 which lock the canopy struts either in the fully extended position (as shown in FIG. 3, in connection with canopy framework 18) or may be partly extended in the cart-form mode (shown in connection with FIG. 5, the partly extended canopy strut length in the cart-form mode is an intermediate length compared to the fully collapsed length shown in the compact form of FIG. 9, as compared to the fully extended mode in FIG. 3). FIG. 3 shows that these struts form a canopy frame 18 for cover 16.

Figure 7:
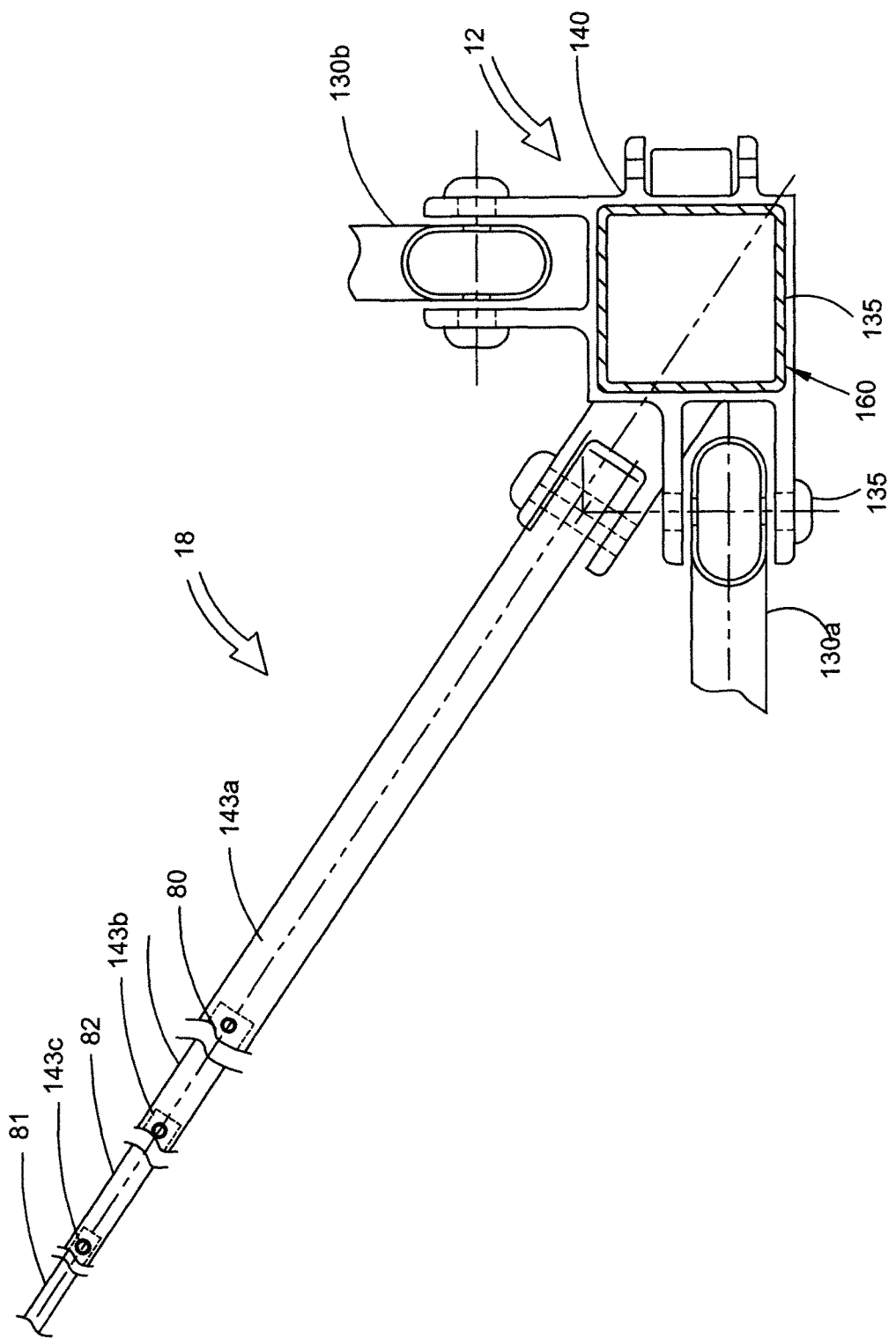
FIG. 7 diagrammatically illustrates one of the telescopically extendable canopy struts, the corner formed by the vertical extendable leg wherein the corner pivotally attaches to the adjoining side frameworks.

FIG. 7 diagrammatically shows upper leg segment 194 of vertically extendable leg 160 forming a corner 140 between side framework 130*a* and side framework 130*b*. Upper leg segment 194 at corner 140 has pivotal connections 135 (these pivotal connections at the lower end of the upper leg segment 194) permitting the scissor members of side frameworks 130*a*, 130*b* to pivot with respect to corner 140 and vertical leg 160. Also, the canopy strut 78 has a lower pivotal connection 87 mounted on corner 140 of vertical leg 160. In this manner, each telescopically extendable canopy strut 78, 80, 82, 81 can rotate with respect to the vertical leg 160 and pivotal connection 87.

Figure 8:
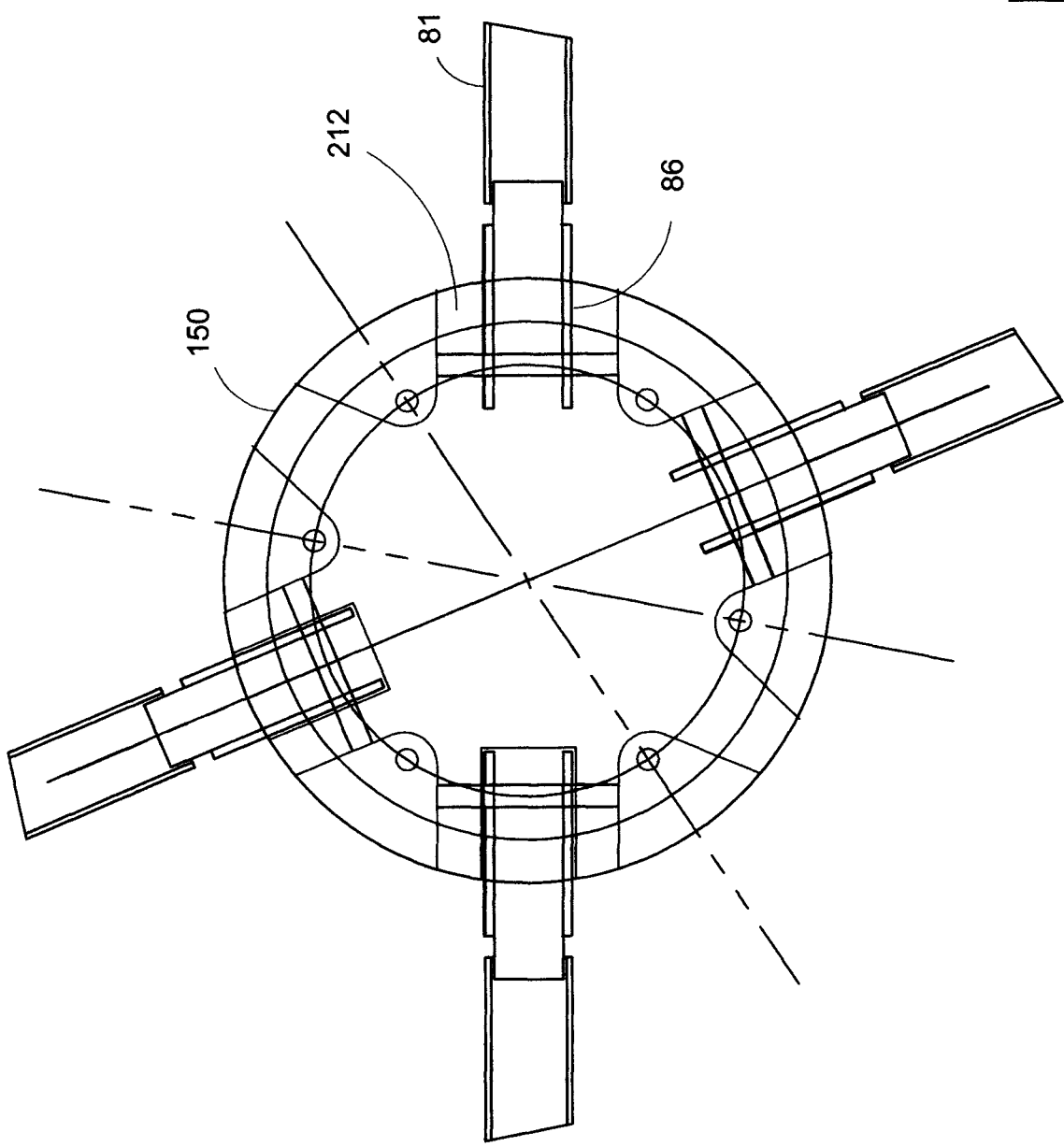
FIG. 8 diagrammatically illustrates the central hub and the pivotal attachment of canopy struts.

FIG. 7 also shows releasable inter-strut locks 143*a*, 143*b*, 143*c* permitting the canopy struts to be fully elongated or fully collapsed dependent upon the open and close position of the inter-strut locks. FIG. 8 diagrammatically shows central hub 150 and the pivotal connections 86 between each of the canopy struts 81. In the cart-form mode of FIG. 1 and FIG. 5, downward motion of central hub 150 is prohibited by an appropriate stop 212 on the underside of central hub 150. The stop limits the pivot of the strut beyond the horizontal plane defined by the to-be-established floor of cart.

Figure 10:
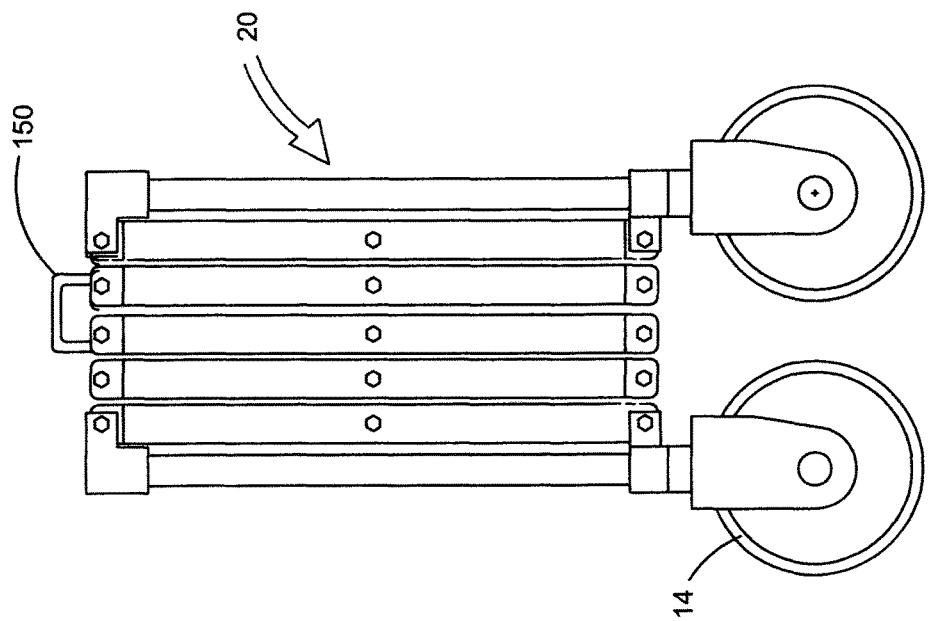
FIG. 10 diagrammatically illustrates a side elevational view of the collapsed compact form of the system.
Figure 9:
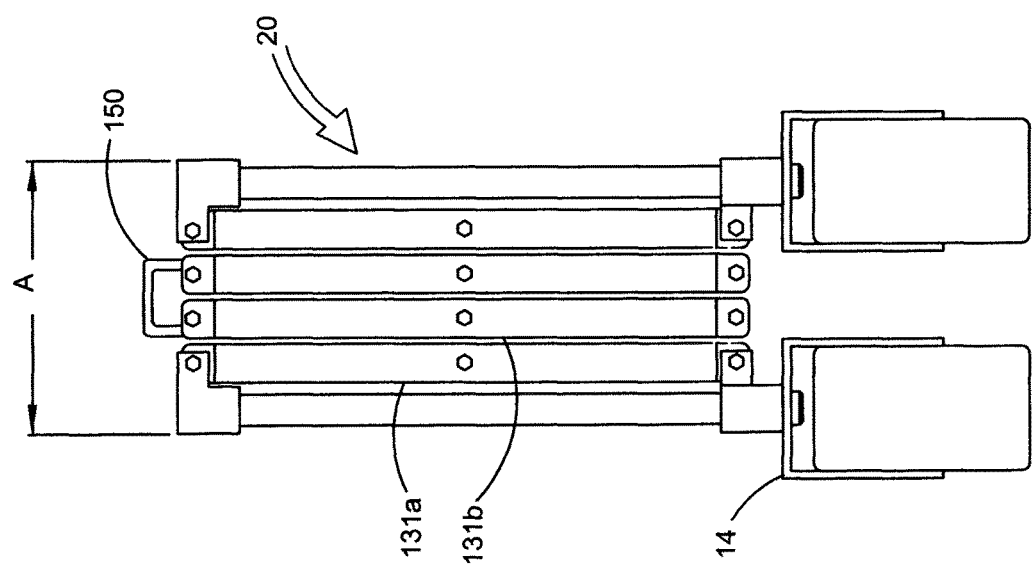
FIG. 9 diagrammatically illustrates a front elevational view of the completely collapsed compact form of the mobile cart convertible to a canopy shelter.
Figure 11B:
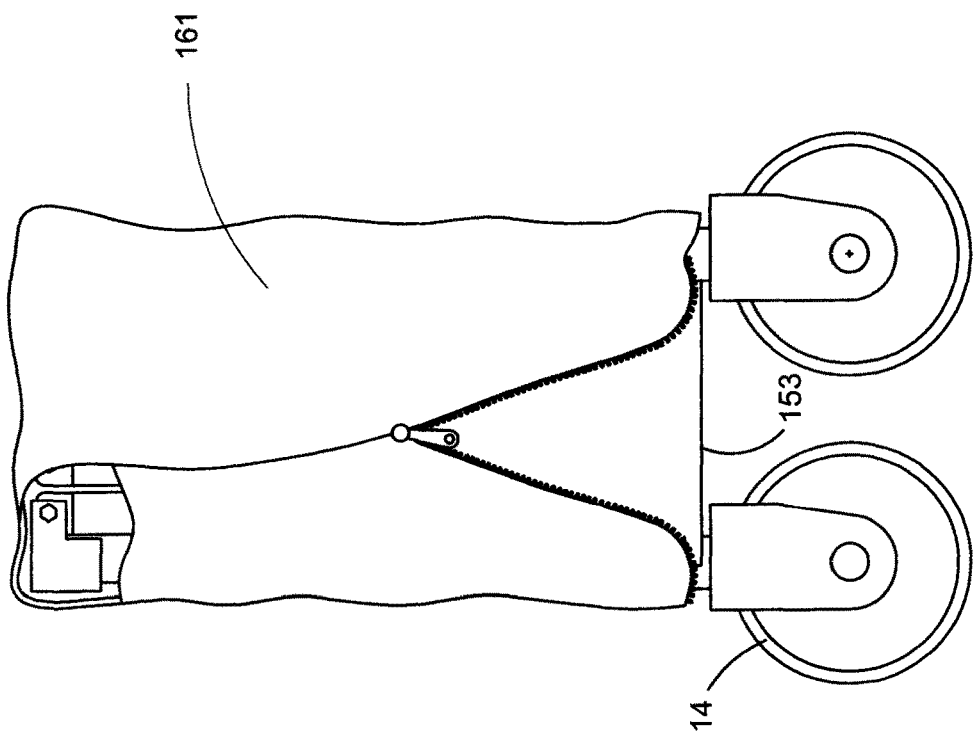
FIGS. 11A and 11B diagrammatically illustrate the collapsed form of the system with partly broken away views of the hinged floor plates and the rectilinear cover which wraps around the hinged floorboard panels in the compact, collapsed system wherein the rectilinear cover does not cover the wheels.
Figure 11A:
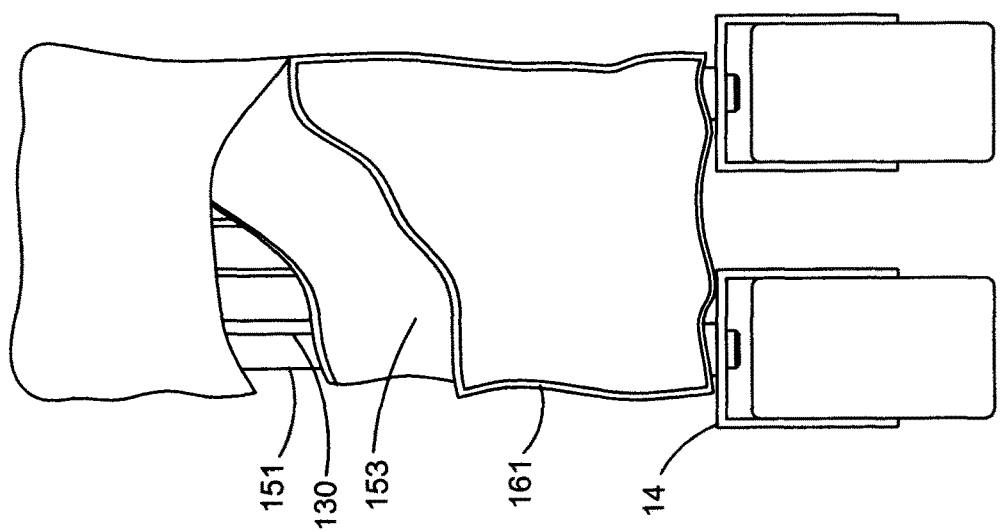

FIGS. 9, 10, and 11A diagrammatically illustrate the fully collapsed and compact mode of the cart-canopy system 20. In the compact mode shown in FIGS. 9 and 10, the front and rear side frameworks and the left or right side frameworks are fully collapsed such that scissor members 131*a*, 131*b* are substantially adjacent each other. Stated otherwise, the scissor frameworks are substantially fully closed. The size of the cart-canopy system 20 in the compact mode is shown as dimension A which is much smaller than the cart-form mode of FIG. 1 and considerably smaller than the fully deployed open canopy mode shown in FIG. 3. In the compact mode, all the canopy struts have been fully collapsed and are substantially adjacent each other in the collapsed or closed, vertical stand mode. Also, the system is designed such in the vertical stand mode, hub 150 is nearly at the same vertical height as compared with the fully collapsed side frameworks shown diagrammatically by scissor members 131a, 131b.

FIGS. 11A and 11B diagrammatically illustrate the collapsed form of the cart-canopy system with partly broken away views of the hinged floor plates 151, 153 and the rectilinear cover 161 which wraps around the hinged floorboard panels 151, 153 in the compact, collapsed system wherein the rectilinear cover 161 does not cover the wheels. FIG. 11B shows a carrying handle. FIG. 11A diagrammatically illustrates the compact mode and canopy struts in the substantially closed, vertical stand mode. Floor plate 153 is shown as a faceplate along the front side of collapsed scissor members and floor plate 151 is diagrammatically shown as a dark bar or line in FIG. 11A and is a faceplate for the other side of the collapsed side frameworks. A rectilinear cover 161 envelops the system in the closed vertical stand mode (the fully compacted scissor closed mode) as well as envelops hinged floor plates 151, 153. Rectilinear cover 161 would include a zipper (FIG. 11B) or other closable systems such as snaps or Velcro or hook and loop connectors such that the rectilinear cover 161 envelops the entire compact structure other than wheels 14.

Figure 12:
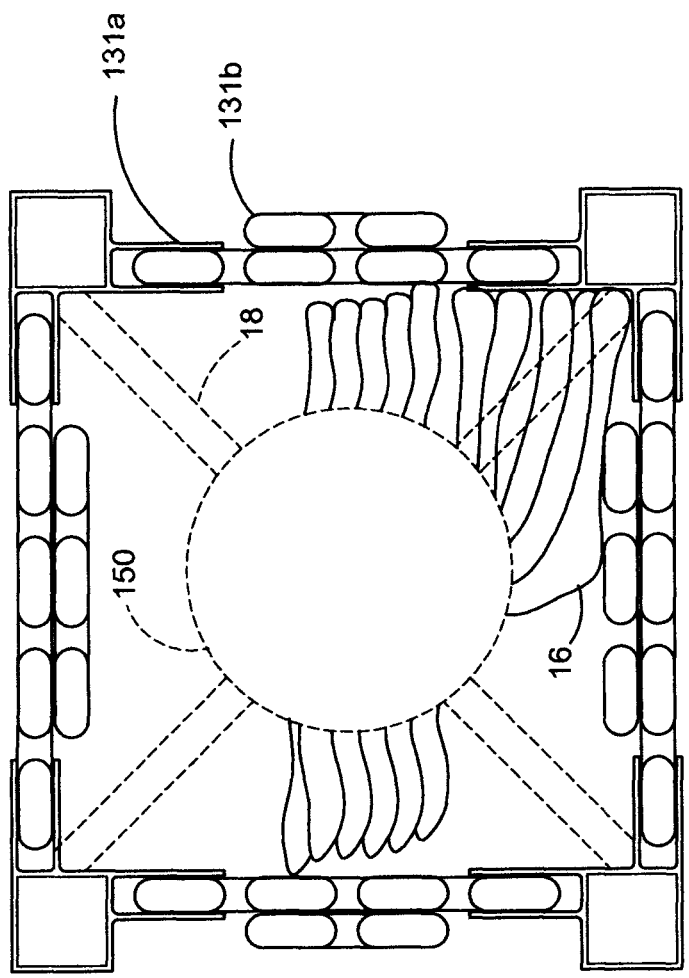
FIG. 12 diagrammatically illustrates the placement of excess fabric canopy cover portions folded interstitially between the side frameworks and the canopy struts (only portions of the folded fabric cover being shown in the figure).

FIG. 12 diagrammatically illustrates a top plan view of the compact structure with fabric canopy cover 16 folded between and placed interstitial the side frameworks (scissor members 131a, 131b) and the collapsed canopy struts 18. The upper ends of canopy struts 18 terminate at central hub 150.

Figure 13:
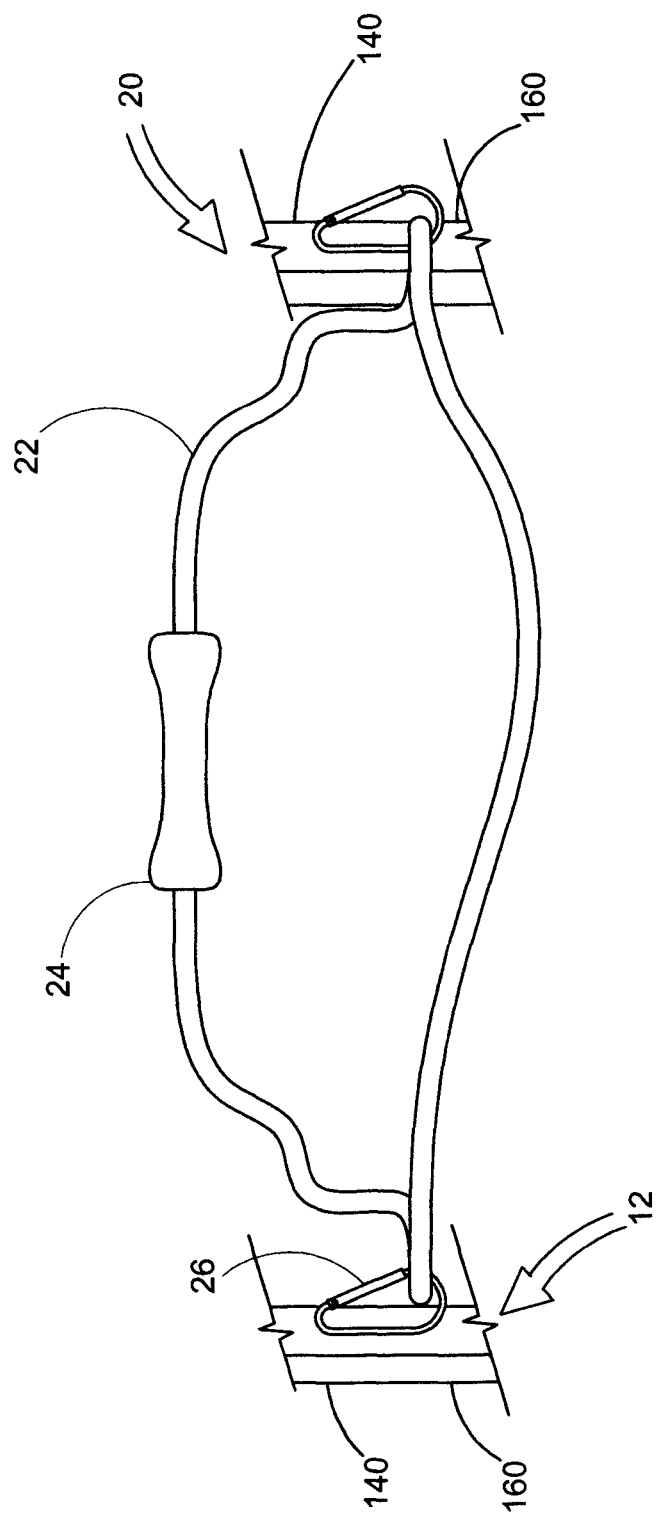
FIG. 13 diagrammatically shows a handle or cord permitting the user to pull the mobile cart in the cart-form mode.

FIG. 13 diagrammatically illustrates that a handle 24 can be placed on cable or tie strap 22 and the ends of the strap is attached to the left and right corner members 140 of legs 160. Any type of corner attachment can be provided for cable 22. Alternatively, the cable can be replaced by handle struts with the distal ends rotatably attached (possibly a 3 dimensional rotation coupling) to opposite corners of the cart and the proximal end (proximal to the user) ending in a user actuatable handle.

FIG. 14 diagrammatically illustrates vertically extendable leg 160 having wheel 14 at a lower end 191 of leg 160. Also, leg 160 is a button lock 162.

FIG. 15 diagrammatically illustrates button lock 162 having a laterally movable, user actuated button surface 164. User actuated button surface 164 is biased laterally outward or outboard by biasing element or spring 166. By depressing user actuated button 164 inboard of leg 160, the leg member or the canopy strut can be telescopically collapsed into each other. The button may be sloped or chamfered on its vertically lower surface (the vertically upper button surface extending farther outboard for user actuation than the lower chamfered surface).

FIG. 16 diagrammatically illustrates a hinge or lever or latch-slot lock. The lever lock or hinge lock 170 includes a user actuated surface 214 which permits the user to pivot actuation end 246 (the latch) in and out of slot 216 on leg 160. Hinge lock 170 includes a biasing member or spring 50 which forces user actuated surface 214 laterally outboard or away from leg surface 160. Hinge lock 170 may be in recess 163 of the leg. When not depressed, the knob or latch at lock element portion 46 of hinge lock 170 extends into slot 216 thereby prohibiting movement of the leg. Since the vertically fully extended position of leg is important, the locking-latch portion 46 of hinge lock 170 is disposed at a vertically higher or upper position compared with user actuation surface 214. In this manner, when the vertical legs are fully telescopically extended, the legs cannot collapse to a compressed position since the weight of the canopy framework 18 and the fabric canopy cover 16 bears down and provides a downward force on the vertically extending legs. In order to assure that locking segment 46 of hinge lock 170 remains in slots 216 of leg 160, a bias member or spring 50 forces user actuated surface 214 to be rotated about pivot point 48 laterally outboard the locking portion 46 of the hinge lock.

Figure 17:
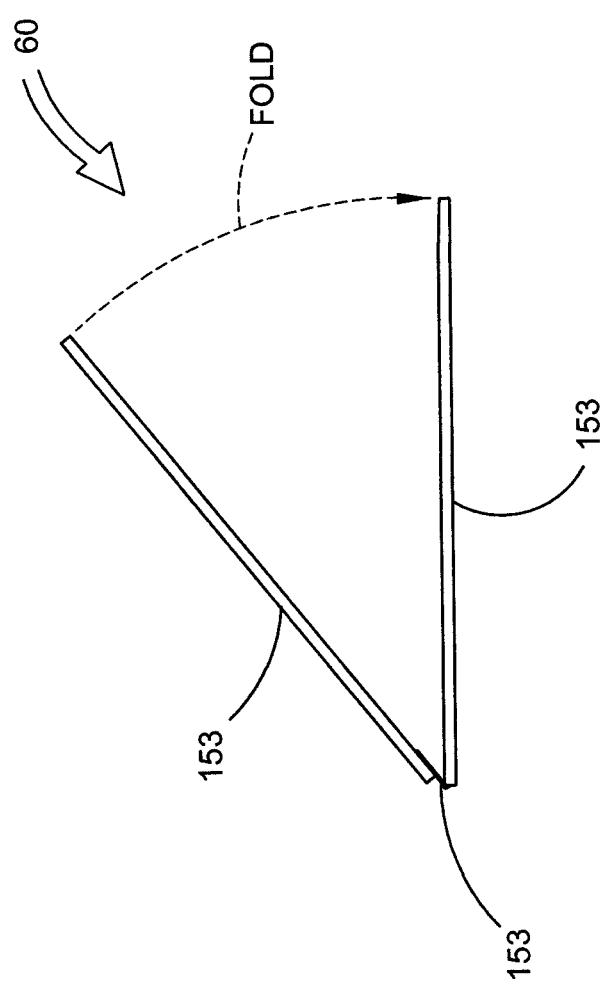
FIG. 17 diagrammatically illustrates the hinged floor plates for the cart-floor mode.

FIG. 17 diagrammatically illustrates that the removable cart floorboard can be configured as hinged floor plates 151, 153. The hinge 152 can take any form including a door hinge or a fabric hinge or any type of element including a releasable Velcro hook and loop strap type hinge. Removable cart floorboard 60 in the preferred embodiment includes floor plates 51, 53.

Figure 18:
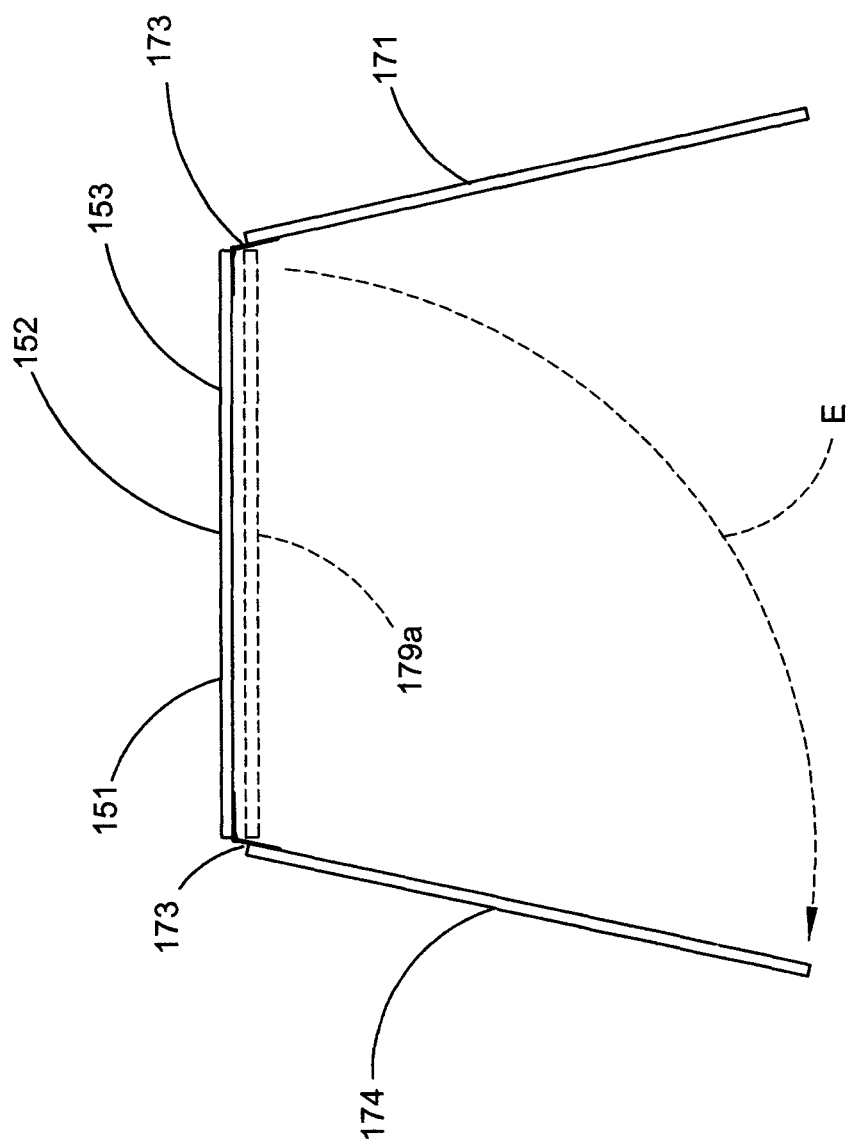
FIG. 18 diagrammatically illustrates a table that can be formed with the hinged floor plates or the removable cart floorboard.

In one embodiment, as shown in FIG. 18, hinged floor plates 151, 153 can be configured as a table. Table legs 174, 171 are hinged to the corresponding floor plates 151, 153 by hinge elements 173. These legs 174, 171 can be collapsed and placed adjacent the underside of floor plates 151, 153 as shown in dashed lines wherein leg 174 is in the position of 174a. To open the table, leg 170 is moved in the direction of arrow E.

FIGS. 19 and 20 diagrammatically illustrate pneumatic or hydraulic valves 182 which can replace the inter-leg member locks or the inter-strut locks discussed earlier. In this situation, in FIG. 19, the valve 182 is open. When open, valve stem 218 with passageway 220 permits either fluid or air to escape through the forward portion of the valve because valve piston 88 is set apart from valve seat 222 of seat body 94. In this manner, air or pneumatic fluid escapes between valve piston 88 valve seat 222.

In FIG. 20, valve piston 88 is on the valve seat thereby closing any flow through passage 220. Element 92 is a user actuated element that opens and closes the valve. A biasing element 90 is provided as a spring to keep the valve piston head 88 seated on valve seat 222.

The operation of the cart-canopy system in its preferred embodiment is discussed below. However, specific functional aspects of certain components have been discussed above, such as the operation of the button lock in the hinge lock. As stated earlier, various different inter-strut locks and inter-leg locks may be utilized other than button locks, hinge locks and pneumatic or hydraulic valve actuated locks.

Starting with the fully compact storage mode in FIG. 11A-B, the user first unlocks or unzips the rectilinear cover 140 and removes the cover from the compact stand which includes the compressed shortened canopy struts in the substantially closed, vertical stand mode. As shown in FIGS. 9 and 10, side frameworks are fully closed or compressed to a nominal size and the scissor members are substantially adjacent each other. Returning to FIG. 11 A-B, hinged floor panels 153, 151, are removed from the compact structure of side frameworks and canopy struts. At this point, the user may deploy and create the table shown in FIG. 18 utilizing the floor panels 151, 153. The rectilinear cover 161 is set aside.

Typically, two persons are needed to assemble the cart-canopy system 20 into either the cart mode of FIG. 1 or the fully deployed canopy mode of FIGS. 2, 3. Removal of the cover and floor panels results in the compact or storage mode shown in FIGS. 9 and 10. The users then laterally expand the front, rear, left, and right side frameworks 130 until these frameworks are partly open generally to the intermediate position shown in FIG. 1. Further, the users vertically elongate the leg members to an intermediate vertical position again shown in FIG. 1.

After raising the structure, the users, at the same time, laterally and longitudinally elongated the scissor frame side frameworks and draw apart or elongate the canopy struts to their intermediate position. The elongation of the canopy struts in the preferred embodiment results from the user's pressing vertically down on central hub 150 from the initial vertical stand position shown slightly vertically elevated above the upper end of completely collapsed legs in FIG. 9. As discussed earlier in connection with the central hub, the hub has stops which prohibit move further downward movement when the struts form strut floor beams shown in FIG. 5. This strut position is intermediate the completely collapsed strut position of FIGS. 9 and 10 compared to the fully deployed strut canopy mode position shown in FIG. 3. As shown in FIG. 5, the struts form floor support beams for the cart floorboard. Although the floorboard in the preferred embodiment includes floor panels 151, 153 which are hinged together, another embodiment has a single unitary floorboard which is placed atop the partly extended canopy struts forming the floor beams.

As discussed above in FIG. 5, fabric canopy cover 16 is draped over the partly expanded front, rear, left, and right side frameworks and is also placed on the cart floorboard. In another embodiment, the floorboard may be eliminated and, in that embodiment, the fabric canopy cover provides a flexible but somewhat usable floor bottom for the open top cart. In a preferred embodiment, the fabric canopy cover is attached to the central hub 150.

The canopy struts in the cart-floor mode would have inter-strut locks which are activated closed (LOCKED) in that partial extension position. Also, the leg members would have inter-leg member locks activated CLOSED in the cart mode shown in FIG. 1. FIG. 1 shows an open-top wheeled cart.

To transition from the open-top cart, the users unlock the inter-strut locks on all the struts and further laterally and longitudinally pull apart the side frameworks to a fully extended position shown in FIG. 3. Typically, this pull-apart action occurs when the vertical legs are at the cart-mode height. If the canopy cover is attached to the hub (preferred embodiment), this requires that the users fluff out the canopy cover during the pull-apart action.

The canopy cover may have zippers over large corner cover sections to close the cart corner sections such that the canopy cover, in the draped mode of the cart-form, somewhat gathers the unnecessary canopy corner portions without unduly filling the open-top cart with excess fabric.

After opening the cover zippers thereby exposing the full lateral and longitudinal extent of the canopy cover B'-B", the users, after unlocking the inter-strut locks on the struts, laterally pull open and longitudinally pull open the side frameworks to the position shown in FIG. 3. The struts auto-lock in the canopy frame 18. Thereafter, the users unlock the inter-leg member locks and vertically extend the legs and raise the canopy framework 18 to its uppermost vertical position. Since the canopy struts locks have been opened by the users or auto-opened, the canopy struts therefore fully extend to form the peaked canopy framework 18 shown in FIG. 3. If the cover fabric is attached to the central hub, the users may laterally and longitudinally fluff out the canopy cover to assure that the corners of the canopy cover mate with and cover the corners 140 formed by the legs and the adjacent corresponding side frameworks.

In the fully deployed canopy mode, shown in FIG. 3, the canopy struts are fully extended and are locked. The inter-strut locks may be designed to automatically lock in the open position. Alternatively, the user may have to manually lock the strut locks. The locks on the legs typically auto-lock when the legs are fully vertically extended. The canopy cover has eaves which fall down and over most of the scissor members of the side frameworks. In the fully open canopy shelter mode, the hub forms a peak for the canopy roof. The peak is slightly vertically higher than the vertical height of the side frameworks and the vertical top height of the legs.

To close the system, the user first unlocks and lowers the legs to a partial vertical height. The user then unlocks the strut locks and laterally and longitudinally compresses inboard the side frameworks. The inboard movement of the frameworks forces the canopy struts to move the hub upward. When the side frameworks are close to the fully closed or scissor member adjacent position, the hub is quite high above the upper vertical ends of the legs and side frameworks. The strut locks are designed such that when a user presses down on the central hub in this near collapsed state, the strut locks open and the user can fully collapse the canopy struts in a fully closed or compressed position as shown in FIG. 9. The chamfered slope on the button locks discussed above enables this push-down-in-an-open-lock action.

Thereafter, the user gathers loose canopy cover fabric and places the loose fabric elements in the interstitial region between the side frameworks and the fully collapsed canopy struts. Also with a zippered cover, the user zips the side corners of the cover together. Then the use partly wraps the floor panels about the fully collapsed construct shown in FIG. 9, and the envelopes the entire collapsed system with the rectilinear cover. This rectilinear cover has a handle or the floor panels have a handle. The rectilinear cover is fully closed by a zipper, fastener or other known element and the handle, being exposed outboard of the rectilinear cover, permits the user to either carry the compacted system or wheel the compacted system to another location.

The invention claimed is:

1. A mobile cart convertible to a canopy shelter comprising:
    front, rear, left and right side expandable frameworks, each side framework having a plurality of scissor members, each side framework having a scissor closed mode wherein each side framework is foreshortened, a scissor open mode wherein each side framework is elongated and expanded, and a cart-form mode wherein each side framework is partly elongated and intermediate the scissor closed mode and the scissor open mode;
    a canopy framework formed by a plurality of telescopically extendable canopy struts and having releasable inter-strut locks;
    a central hub having a respective plurality of pivotable connectors attached to corresponding ones of the plurality of canopy struts;
    four vertically telescopically extendable legs, each leg having a wheel at one terminal end, each leg having an upper leg segment, and each upper leg segment having pivotal framework connections defining a respective corner between adjoining side frameworks, each leg having telescopically extendable leg members with releasable inter-leg member locks;
    a fabric canopy cover large enough to span said side framework in the scissor open mode;
    the canopy struts having a fully extended, locked open canopy mode forming a pitched canopy frame with the central hub forming a peak when the canopy framework is in the open canopy mode, the canopy struts having a substantially closed, vertical stand mode wherein each canopy strut is substantially telescopically collapsed, and the canopy struts having a cart-floor mode wherein each canopy strut is partly telescopically collapsed and intermediate the substantially closed, stand mode and the open canopy mode; and when the side frameworks are in the cart-form mode, and the canopy struts are in the cart-floor mode, the fabric canopy is adapted to be folded over the side frameworks in the cart-form mode and laid atop the canopy struts to form a wheeled open-top cart;

a removable cart floorboard adapted to be placed atop the plurality of canopy struts when in the cart-floor mode;

wherein the canopy struts in the cart-floor mode form diagonal floor supports for the cart floorboard and at least one inter-strut lock on each telescopically extendable canopy strut is locked.

2. The cart convertible to the canopy shelter as claimed in claim 1 wherein the legs have substantially telescopically collapsed mode and a telescopically vertically extended mode such that in the telescopically vertically extended mode, the legs elevate the side frameworks, the canopy struts and the fabric canopy cover above a ground plane.

3. The cart convertible to the canopy shelter as claimed in claim 1 wherein when the canopy struts are in the substantially closed, vertical stand mode, and the side frameworks are in the scissor closed mode, the fabric canopy cover is adapted to be folded interstitial the side frameworks and the canopy struts.

4. The cart convertible to the canopy shelter as claimed in claim 1 wherein when the canopy struts are in the substantially closed, vertical stand mode, and the side frameworks are in the scissor closed mode, the central hub does not substantially extend above the side frameworks.

5. The cart convertible to the canopy shelter as claimed in claim 1 wherein the central hub has a respective plurality of upper pivotable connectors attached to corresponding ones of the plurality of canopy struts; and wherein each of the four vertically telescopically extendable legs have a lower leg segment with the respective wheel at its lower terminus, and each lower leg segment having a respective lower pivotal strut connection attached to corresponding ones of the plurality of canopy struts opposite the upper pivotable connectors.

6. The cart convertible to the canopy shelter as claimed in claim 1 wherein the fabric canopy cover includes eaves which hang over the side framework in the scissor open mode.

7. The cart convertible to the canopy shelter as claimed in claim 1
wherein the cart floorboard is a hinged floorboard with hinged floor plates and a respective floor plate has a lateral span substantially equivalent to a corresponding side framework while in the scissor closed mode, such that when the hinged floorboard removed from the open-top cart, a respective hinged floor plate is adapted to partly wrap around a corresponding side framework when the canopy struts are in the substantially closed, vertical stand mode, the side frameworks are in the scissor closed mode, and the fabric canopy cover is folded interstitial the side frameworks and the canopy struts.

8. The cart convertible to the canopy shelter as claimed in claim 7 wherein the central hub forms a vertically extensive peak when the canopy framework is in the open canopy mode, and the peak being above each elongated, expanded side framework while in the scissor open mode.

9. The cart convertible to the canopy shelter as claimed in claim 8 wherein the canopy struts are substantially adjacent each other in the substantially closed, vertical stand mode.

10. The cart convertible to the canopy shelter as claimed in claim 9 wherein the locks are mechanical, pneumatic or hydraulic.

11. A method of converting a mobile cart to a canopy shelter comprising:
providing:
front, rear, left and right side expandable frameworks, each side framework having a plurality of scissor members;
a canopy framework formed by a plurality of telescopically extendable canopy struts;
a central hub pivotally connected to the plurality of canopy struts;
four vertically telescopically extendable legs with wheels at terminal ends thereof, each telescopically extendable leg having an upper leg segment defining a side framework corner which is pivotally connected to adjoining side frameworks;
a fabric canopy cover large enough to span the expanded side frameworks;
the method including:
from a compact form wherein the side frameworks are in a scissor closed mode, the canopy struts are in a substantially telescopically closed, vertical stand mode, and the vertically extendable legs are in a telescopically leg collapsed positional mode;
substantially simultaneously extending the side frameworks and the canopy struts to an intermediate side frameworks position and an intermediate canopy struts position while depressing the central hub and telescopically diagonally expanding the canopy struts, and causing the central hub to lockdown into a cart-floor support frame by limiting further downward movement of the canopy struts;
forming an open-top cart by hanging the fabric canopy cover over the side frameworks in the intermediate side frameworks position wherein the fabric canopy cover defines at least sidewalls of the open-top cart; and
forming a canopy shelter, the canopy shelter disposed above a ground plane by lifting the central hub and telescopically extending the canopy struts while substantially simultaneously extending the side frameworks to a canopy deployed positional mode wherein the scissor members are elongated beyond the intermediate side frameworks position, locking the canopy struts in the canopy deployed mode to maintain the side frameworks in the canopy deployed mode, and telescopically vertically raising the extendable legs to a high canopy position relative to the ground plane, and locking together the extendable legs.

12. The method of converting the mobile cart to the canopy shelter as claimed in claim 11 wherein the fabric canopy cover is attached to the central hub thereby forming a fabric cart floor above the canopy struts and the cart-floor support frame.

13. The method of converting the mobile cart to the canopy shelter as claimed in claim 11 including forming eaves along the periphery of the fabric canopy cover with excessive cover materials.

14. The method of converting the mobile cart to the canopy shelter as claimed in claim 11 including,
in the compact form,
placing the fabric canopy cover in the interstitial space between the side frameworks in the scissor closed mode and the canopy struts in the telescopically closed, vertical stand mode;

providing a rectilinear cover and providing an exposed carrying handle;

enveloping with the rectilinear cover the side frameworks, the canopy framework, the telescopically closed canopy struts in the vertical stand mode, the vertically extendable legs in the telescopically leg collapsed positional mode, and the fabric canopy cover;

thereby enabling both wheeled transport in the compact form and handle-carried transport in the compact form.

15. The method of converting the mobile cart to the canopy shelter as claimed in claim 14, providing a cart floorboard with hinged floorboard panels; and prior to enveloping the same with the rectilinear cover, wrapping the hinged floorboard panels partly around the compact form consisting of the fabric canopy cover in the interstitial space, the side frameworks in the scissor closed mode, and the canopy struts in the telescopically closed, vertical stand mode.

16. The method of converting the mobile cart to the canopy shelter as claimed in claim 11 including forming a pitched canopy frame with the central hub forming a vertically extensive peak when the canopy framework is in the open canopy mode.

17. The method of converting the mobile cart to the canopy shelter as claimed in claim 11 including telescopically collapsing the canopy struts to the closed, vertical stand mode such that the central hub does not substantially extend above the side frameworks when the side frameworks are in the scissor closed mode.

18. The method of converting the mobile cart to the canopy shelter as claimed in claim 11 including providing a removable cart floorboard with four collapsible table legs pivotally disposed beneath the cart floorboard, placing the floorboard at a bottom of the open-top cart, and upon withdrawal of the cart floorboard from the open-top cart, deploying the table legs to elevate the floorboard above the ground plane to form a table.

19. A mobile cart convertible to a canopy shelter comprising:

front, rear, left and right side expandable frameworks, each side framework having a closed mode wherein each side framework is foreshortened, an open mode wherein each side framework is elongated and expanded, and a cart-form mode wherein each side framework is partly elongated and intermediate the closed mode and the open mode;

a canopy framework formed by a plurality of telescopically extendable canopy struts and having releasable inter-strut locks;

a central hub having a respective plurality of pivotable connectors attached to corresponding ones of the plurality of canopy struts;

four vertically telescopically extendable legs, each leg having a wheel at one terminal end, each leg having an upper leg segment, and each upper leg segment having pivotal framework connections defining a respective corner between adjoining side frameworks, each leg having telescopically extendable leg members with releasable inter-leg member locks;

a fabric canopy cover large enough to span said side framework in the open mode;

the canopy struts having a fully extended, locked open canopy mode forming a canopy frame with the central hub forming a central support when the canopy framework is in the open canopy mode, the canopy struts having a substantially closed, vertical stand mode wherein each canopy strut is substantially telescopically collapsed, and the canopy struts having a cart-floor mode wherein each canopy strut is partly telescopically collapsed and intermediate the substantially closed, stand mode and the open canopy mode; and when the side frameworks are in the cart-form mode, and the canopy struts are in the cart-floor mode, the fabric canopy is adapted to be folded over the side frameworks in the cart-form mode and laid atop the canopy struts to form a wheeled open-top cart;

a removable cart floorboard adapted to be placed atop the plurality of canopy struts when in the cart-floor mode;

wherein the canopy struts in the cart-floor mode form diagonal floor supports for the cart floorboard and at least one inter-strut lock on each telescopically extendable canopy strut is locked.

\* \* \* \* \*